(12) United States Patent
Huang et al.

(10) Patent No.: US 7,349,486 B2
(45) Date of Patent: Mar. 25, 2008

(54) SYSTEM AND METHOD FOR RECOGNIZING ZERO-AMPLITUDE SYMBOLS IN A QAM SIGNAL AND DIGITAL RECEIVER INCORPORATING THE SAME

(75) Inventors: Gang Huang, Highlands, NJ (US); Min Liang, Morganville, NJ (US); Zhenyu Wang, Morganville, NJ (US)

(73) Assignee: Agere Systems Guardian Corporation, Orlando, FL (US)

( * ) Notice: Subject to any disclaimer, the term of this patent is extended or adjusted under 35 U.S.C. 154(b) by 754 days.

(21) Appl. No.: 09/909,394

(22) Filed: Jul. 19, 2001

(65) Prior Publication Data

US 2003/0016768 A1   Jan. 23, 2003

(51) Int. Cl.
*H04L 23/02* (2006.01)
(52) U.S. Cl. ...................................... 375/261
(58) Field of Classification Search ................ 375/340, 375/348, 357, 344, 377, 242, 233, 216, 261; 370/207, 208, 342; 703/2; 341/50; 329/304–310
See application file for complete search history.

(56) References Cited

U.S. PATENT DOCUMENTS

| | | | | |
|---|---|---|---|---|
| 4,562,425 A * | 12/1985 | Turner et al. ................ 341/51 |
| 4,644,537 A * | 2/1987 | Gitlin et al. ................ 370/207 |
| 5,381,450 A * | 1/1995 | Lane .......................... 375/340 |
| 5,418,815 A * | 5/1995 | Ishikawa et al. ............ 375/216 |
| 5,471,508 A * | 11/1995 | Koslov ....................... 375/344 |
| 5,521,949 A * | 5/1996 | Huang et al. ............... 375/377 |
| 5,694,389 A * | 12/1997 | Seki et al. ................... 370/208 |
| 5,799,037 A * | 8/1998 | Strolle et al. ............... 375/233 |
| 5,832,041 A * | 11/1998 | Hulyalkar ................... 375/340 |
| 6,133,785 A * | 10/2000 | Bourdeau ................... 329/304 |
| 6,313,885 B1* | 11/2001 | Patel et al. ................. 348/725 |
| 6,438,187 B1* | 8/2002 | Abbey ......................... 375/368 |
| 6,476,734 B2* | 11/2002 | Jeong et al. ................ 341/50 |
| 6,553,087 B1* | 4/2003 | Alelyunas et al. ......... 375/357 |
| 6,687,306 B1* | 2/2004 | Wang et al. ................ 375/242 |
| 6,853,631 B1* | 2/2005 | Nakamura et al. ......... 370/342 |
| 2002/0007257 A1* | 1/2002 | Riess et al. ................. 703/2 |
| 2002/0037062 A1* | 3/2002 | Riess et al. ................. 375/348 |

OTHER PUBLICATIONS

Messerschmitt & Lee; Digital Communications; Copyright 1988 by Kluwer Academic Publishers; pp. 152-153 (Sec. 6.1.3, Example 6-8) & p. 186-189 (Sec. 6.5, Fig. 6-28).*
"Digital Communications" by John G. Proakis; Third Edition; McGraw-Hill, Inc.; 1995; pp. 178-180.
"Wireless Communications—Principles and Practice" by Theodore S. Rappaport; Prentice Hall PTR; 1996; pp. 270-272.

* cited by examiner

*Primary Examiner*—Don N Vo

(57) ABSTRACT

A system for, and method of, recognizing zero-amplitude symbols in a quadrature amplitude modulated (QAM) signal and a digital receiver incorporating the system or the method. In one embodiment, the system includes: (1) an amplitude detector that extracts a candidate symbol from the signal and locates the candidate symbol relative to a constellation of symbols and (2) a zero-amplitude symbol interpreter, associated with the amplitude detector, that recognizes the candidate symbol as being a zero-amplitude symbol when the candidate symbol is closer to an origin of the constellation than to symbols proximate thereto.

21 Claims, 4 Drawing Sheets

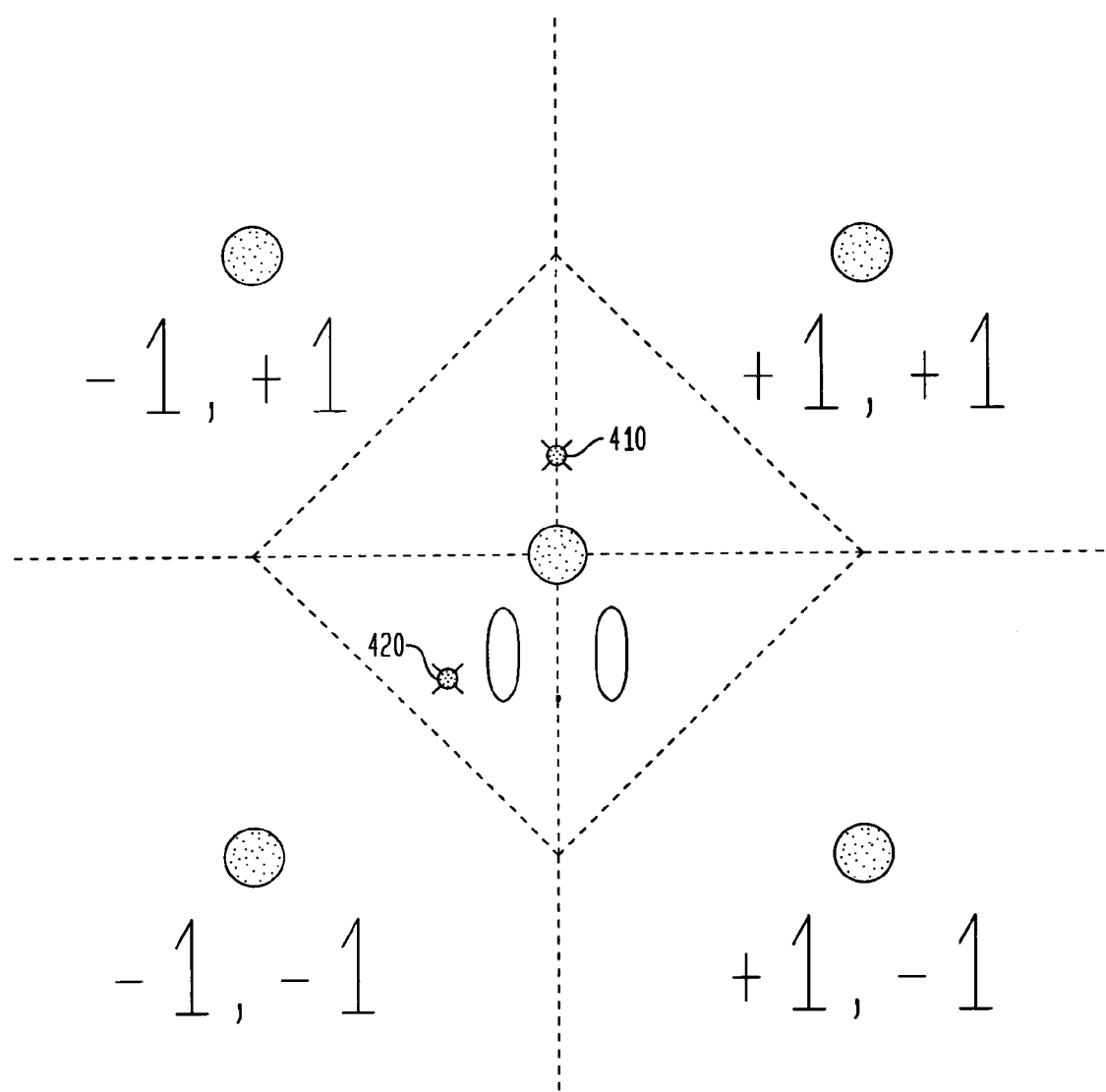

SYSTEM AND METHOD FOR RECOGNIZING ZERO-AMPLITUDE SYMBOLS IN A QAM SIGNAL AND DIGITAL RECEIVER INCORPORATING THE SAME

TECHNICAL FIELD OF THE INVENTION

The present invention is directed, in general, to digital communication systems and, more specifically, to a system and method for recognizing zero-amplitude symbols in a quadrature amplitude modulation (QAM) signal and a digital receiver incorporating the system or the method.

BACKGROUND OF THE INVENTION

HPNA, also referred to as HomePNA, is a de facto home networking standard developed by the Home Phoneline Networking Alliance. This technology, building on Ethernets, allows all the components of a home network to interact over the home's existing telephone wiring without disturbing the existing voice or fax services. In the same way a LAN operates, home networking processes, manages, transports and stores information, which enables the disparate devices in a home network such as telephones, fax machines, desktops, laptops, printers, scanners and Web cameras to connect and integrate over a home's unpredictable wiring topology. HPNA technology must coexist with telephone service and comply with FCC Part 68 contained within Subpart 47 of the Code of Federal Regulations.

In conjunction with the transfer of information across a telecommunications network, a networking standard, such as HPNA, often employs modulation techniques to more efficiently transfer the information across the network. For instance, quadrature amplitude modulation (QAM) is one modulation technique that carries information in both an in-phase and quadrature direction and shifts the signal band around a single carrier frequency, enabling thereby a higher rate of information transfer through a given transmission medium.

In QAM, the unit of information transferred is called a "symbol," which advantageously represents multiple bits of information. Although QAM has no official defined symbol to represent the value (0, 0) (a "zero-amplitude" symbol) when mapped to a Cartesian coordinate system, a de-facto symbol with the value (0, 0) has been generally used to represent such information as an "end of file" condition, an "end of subframe" condition, and so on. For a more detailed presentation of QAM, see "Digital Communications", $3^{rd}$ Edition, by John Proakis, pages 178-180 and also see "Wireless Communications" by Theodore Rappaport, pages 270-272, both of which are hereby incorporated by reference in their entirety.

However, in the prior art, interpreting some QAM symbols posed certain troubling issues. For instance, due to such problems as noise on a telephone line or other transmission medium, the received symbol may not fit exactly in a given constellation of symbols. This can lead to an ambiguity of interpretation of the received symbol. The zero-amplitude symbol is no exception.

However, when using QAM, accurately defining the area or zone of the Cartesian plane that should correspond to a received zero-amplitude symbol has been unsatisfactory. Accordingly, what is needed in the art is a system and method that more accurately interprets a potential zero-amplitude symbol that overcomes the deficiencies of the prior art.

SUMMARY OF THE INVENTION

To address the above-discussed deficiencies of the prior art, the present invention provides a system for, and method of, recognizing zero-amplitude symbols in a quadrature amplitude modulated (QAM) signal and a digital receiver incorporating the system or the method. In one embodiment, the system includes: (1) an amplitude detector that extracts a candidate symbol from the signal and locates the candidate symbol relative to a constellation of symbols and (2) a zero-amplitude symbol interpreter, associated with the amplitude detector, that recognizes the candidate symbol as being a zero-amplitude symbol when the candidate symbol is closer to an origin of the constellation than to symbols proximate thereto.

The present invention successfully addresses the shortcomings of the prior art by more appropriately classifying incoming candidate zero-amplitude symbols according to their position relative to the origin of the constellation and neighboring symbols. When candidates are closer to the origin, they are recognized as being of zero-amplitude. When candidates are closer to a neighboring symbol, they are recognized as being that neighboring symbol.

This is in stark contrast to conventional systems, which quantized symbols based on their separate (A and B) components. This had the effect of creating a square about the origin of the constellation. This approach was defective, in that it allowed symbols that were closer to the zero-amplitude symbol than to neighboring symbols be falsely interpreted as a nonzero amplitude symbol, and, just as bad, vice versa.

In one embodiment of the present invention, the zero-amplitude symbol constitutes an end-of-file symbol according to the HPNA standard. In a related embodiment, a plurality of the zero-amplitude symbols separate subframes according to the HPNA standard. Improved recognition of zero-amplitude symbols enhances decoding of incoming symbols and results in improved data integrity.

In one embodiment of the present invention, the symbols proximate the origin number four in quantity. In a more specific embodiment, the symbols proximate the origin are located at relative amplitudes of: (1) 1, 1, (2) 1, −1, (3) −1, 1 and (4) −1, −1. In an embodiment to be illustrated and described, the constellation is arranged on a Cartesian plane.

In one embodiment of the present invention, the zero-amplitude symbol interpreter is free of a slicer table. In an embodiment to be illustrated and described, the zero-amplitude symbol interpreter operates instead with a linear algorithm. The linear algorithm calls for the candidate symbol to be recognized as a zero-amplitude symbol when the sum of the absolute value of the A and B coordinates of the candidate symbol is less than one. If not, the candidate symbol is not recognized as a zero-amplitude symbol, and a conventional slicer table is then employed to determine to which of the nonzero-amplitude symbols the candidate symbol is closest. Of course, the present invention is not limited to a particular coordinate system, constellation, scale or number of symbols. Neither does the present invention depend upon subsequent use of a slicer table.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 illustrates an enlarged view of the graphical representation of FIG. 3, along with exemplary symbol recognitions to illustrate operation of the present invention.

DETAILED DESCRIPTION

Figure 1:
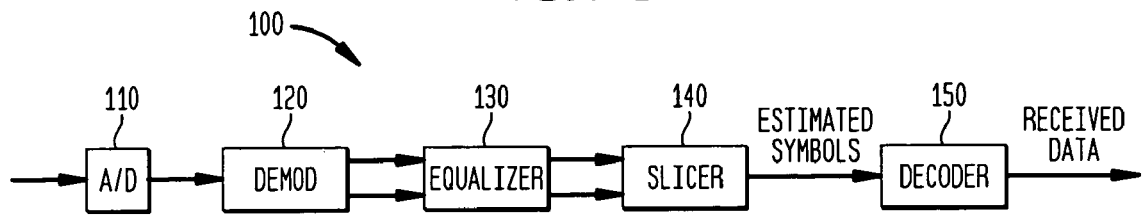
FIG. 1 illustrates a block diagram of an embodiment of a QAM digital communications receiver that provides an environment within which the system or the method of the present invention can operate.

Referring initially to FIG. 1, illustrated is a system level diagram of an embodiment of a QAM digital communications receiver ("receiver") 100 providing an environment for the application of the principles of the present invention. The receiver 100 generally converts received analog communication signals into digital samples wherein the digital equivalent of the analog signal is demodulated, equalized and decoded. The receiver 100 will now be described in more detail.

The receiver 100 employs an analog to digital converter 110 for converting a received analog signal to digital data. The analog to digital converter 110 may be of a conventional type, and therefore will not be described in further detail.

The receiver 100 employs a demodulator 120 to demodulate the digital equivalent of the analog signal. The demodulator 120 uses a modulation scheme, such as QAM modulation, to extract necessary units of information from a carrier wave or carrier waves, such as superimposed sinusoidal functions of differing phase shifts. The demodulator 120 generally extracts two demodulated values from the information superimposed upon these two sinusoidal waves and provides the values to an equalizer 130.

The equalizer 130 generally compensates for undesired amplitude characteristics of the two demodulated values, although certainly other equalizer functionality is well within the scope of the present invention. The uses of equalizers are well known to those skilled in the art and will not be described in further detail. The equalizer 130 provides the compensated values to a slicer 140.

The slicer 140 maps the two demodulated values on a Cartesian plane, creating a "candidate" symbol. Because various errors may have somehow been introduced into the symbol transmission process, the candidate symbol may not be exactly on a pre-defined ideal symbol constellation point, as so defined by the slicer 140. The slicer 140 then compares the candidate symbol to pre-defined ideal signal constellation points of a slicer table, although this comparison also may be done with the aid of a linear algorithm. After this comparison, the slicer 140 interprets the candidate symbol by deciding which of the constellation points the candidate symbol best fits. This assignment is a function of the proximity of the candidate symbol to one of the pre-defined symbol constellation points. The slicer 140 then converts the candidate symbol into an appropriate estimated symbol value as a function of the nearest proximate constellation symbol.

The zero-amplitude symbol may be used in such networking schemes as Home Phoneline Networking Alliance ("HPNA") for transmitting specific information, such as an end-of-file conditions or end of subframe conditions. An improved zero-amplitude symbol interpretation estimation, such as may take place within the slicer 140 of the present invention, will be described in greater detail in FIG. 2, below.

A decoder 150 then translates the estimated symbols provided from the slicer 140 into data of a different format, such as a binary code. The decoder 150 may be of a conventional type, and will not be described in further detail.

Figure 2:
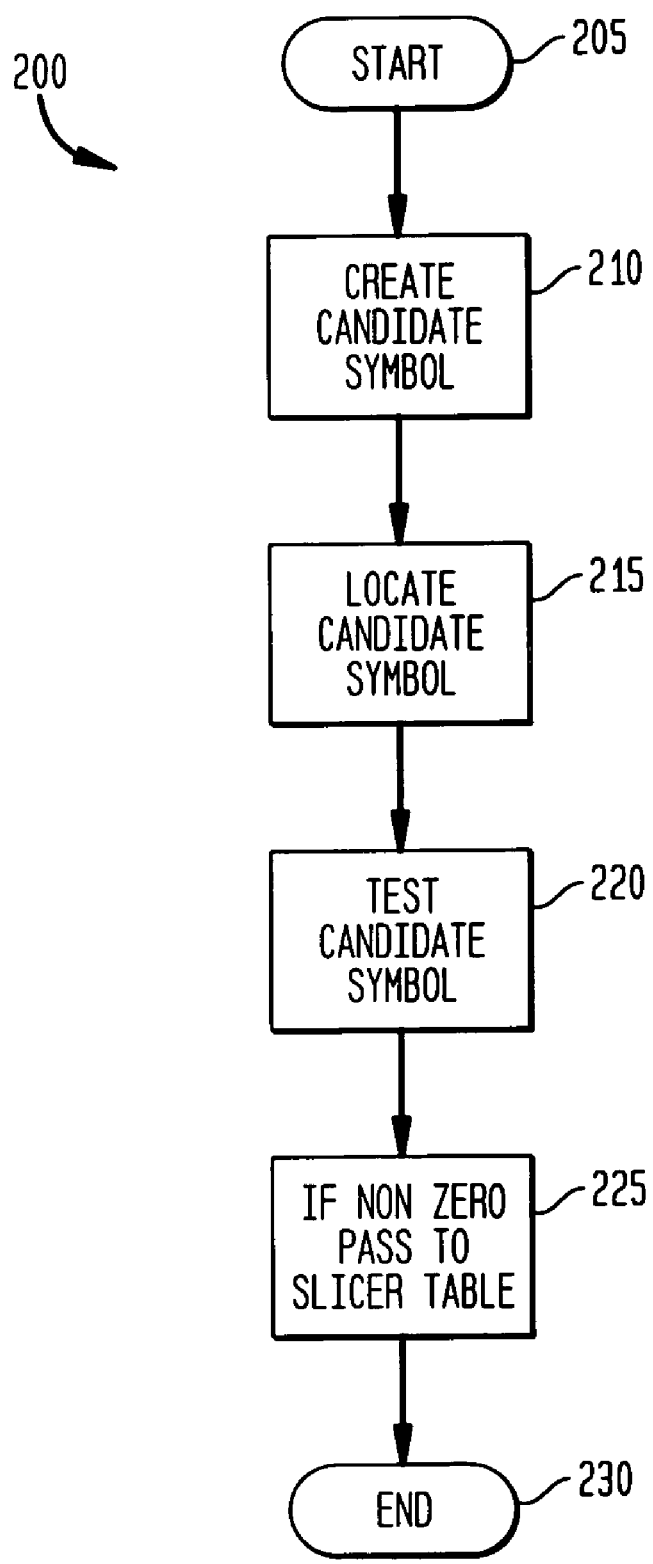
FIG. 2 illustrates a flow diagram of method of recognizing zero-amplitude symbols in a QAM signal constructed according to the principles of the present invention.

Turning now to FIG. 2, illustrated is a flow diagram of method of recognizing zero-amplitude symbols in a QAM signal constructed according to the principles of the present invention. The detector 200 generally deciphers the two demodulated values of FIG. 1 and determines whether they should be interpreted as being a zero-amplitude symbol.

The method begins in a start step 205 after two demodulated values are received from the equalizer 130 of FIG. 1. An amplitude detector is then employed to create a candidate symbol as a function of the two demodulated values in a step 210. Then, in a step 215, the candidate symbol is located relative to a constellation of symbols. For the purposes of illustration, a hypothetical candidate symbol S1 is placed in a Cartesian plane as a function of its value.

Next, in a step 220, the candidate symbol is tested to determine whether it should be recognized as a zero-amplitude symbol. In the illustrated embodiment, the neighboring ideal constellation symbols are located at the relative amplitudes of: (1, 1), (1, −1), (−1, 1) and (−1, −1) of a Cartesian plane. According to the present invention, the candidate symbol is recognized as being a zero-amplitude symbol when the candidate symbol is placed or interpreted as being closer to the origin (0, 0) of the constellation than to any of the neighboring ideal constellation symbols (e.g., (1, 1), (1, −1), (−1, 1) and (−1, −1)).

More specifically, if any of the following conditions are met, the candidate symbol is determined to be a zero-amplitude symbol:

If $A>0$ and $B>0$ and $\{(A+B)<1\}$ or if $A>0$ and $B<0$ and $\{(A-B)<1\}$ or if $A<0$ and $B<0$ and $\{(A+B)>-1\}$ or if $A<0$ and $B>0$ and $\{(A-B)>-1\}$ (Please note that the above can also be simplified to $|A+B|<1$.) If none of these conditions is met, the candidate symbol is passed to a conventional slicer table for recognition as a nonzero-amplitude symbol in a step 225. The method ends in an end step 230.

Figure 3:
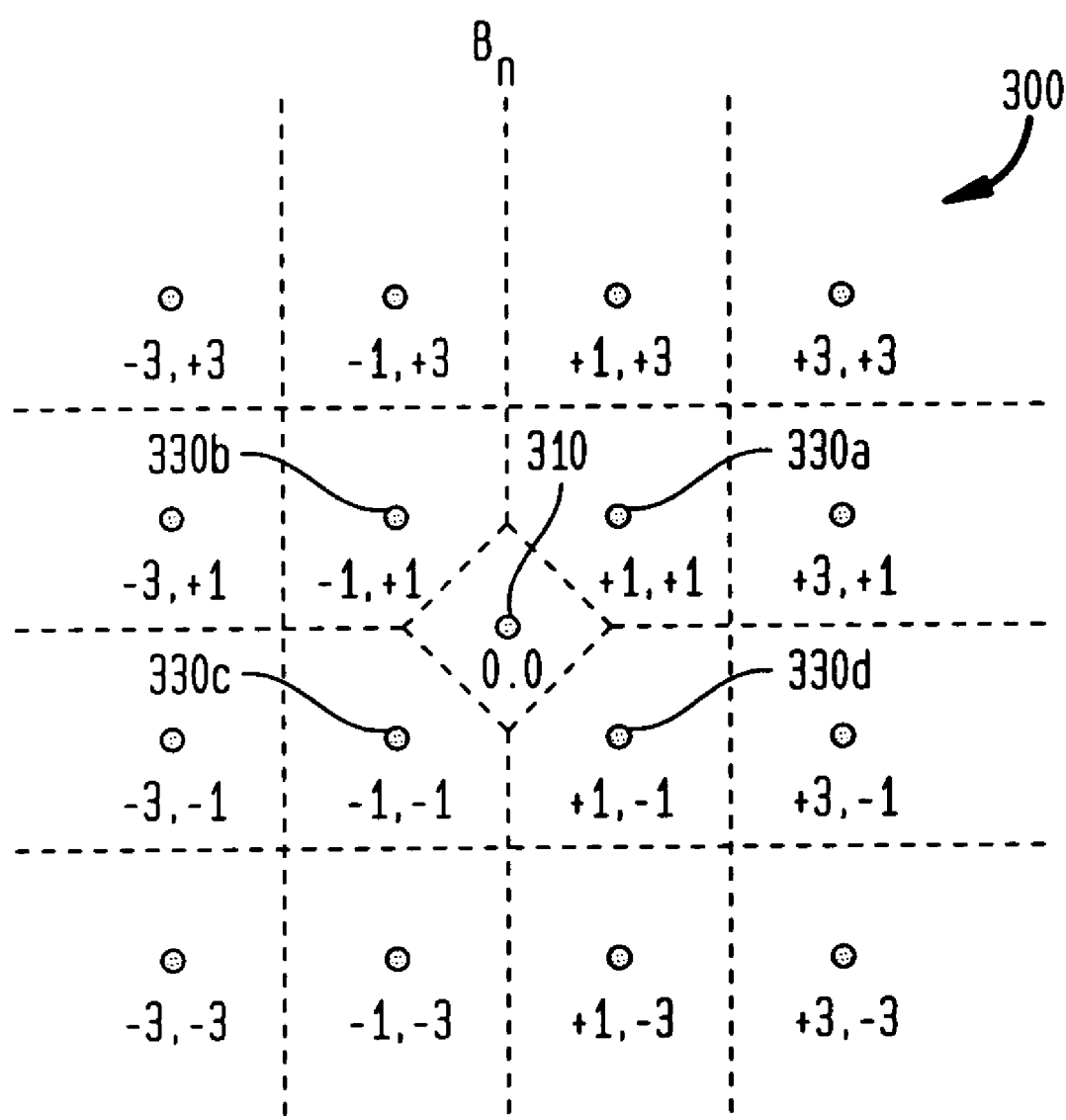
FIG. 3 illustrates a graphical representation of a zero-amplitude symbol zone within a two dimensional symbol constellation defined according to the principles of the present invention.

Turning now to FIG. 3, illustrated is a graphical representation of a zero-amplitude symbol zone 310 within a two dimensional symbol constellation 300. The zero-amplitude symbol zone 310 is defined according to the principles of the present invention. The boundary of the zero-amplitude symbol zone 310 is formed by the set of points that are equidistant between an origin 320 of the constellation 300 and the nearest one of four neighboring ideal symbols 330a, 330b, 330c, 330d in the constellation 300. Candidate symbols falling in the zero-amplitude symbol zone 310 are recognized as zero-amplitude symbols. Candidate symbols falling outside the zero-amplitude symbol zone 310 are recognized as nonzero-amplitude symbols, and more specifically recognized as a particular nonzero-amplitude symbol, perhaps according to a conventional slicer table.

Turning now to FIG. 4, illustrated is an enlarged view of the graphical representation of FIG. 3, along with exemplary symbol recognitions to illustrate operation of the present invention.

A first exemplary candidate symbol 410 has A and B values of 0 and 0.4, respectively. Accordingly, since A>0 and B>0 and {(A+B)<1}, the first exemplary candidate symbol 410 is recognized as a zero-amplitude symbol. (Interestingly, prior art systems would have erroneously recognized the first exemplary candidate symbol 410 as the nonzero-amplitude symbol 330b).

A second exemplary candidate symbol 420 has A and B values of −0.3 and −0.3, respectively. Accordingly, since A<0 and B<0 and {(A+B)>−1}, the first exemplary candidate symbol 410 is recognized as a zero-amplitude symbol. (Again, prior art systems would have erroneously recognized the first exemplary candidate symbol 410 as the nonzero-amplitude symbol 330d).

From the above, it is apparent that the present invention provides a system for, and method of, recognizing zero-amplitude symbols in a QAM signal and a digital receiver incorporating the system or the method. In one embodiment, the system includes: (1) an amplitude detector that extracts a candidate symbol from the signal and locates the candidate symbol relative to a constellation of symbols and (2) a zero-amplitude symbol interpreter, associated with the amplitude detector, that recognizes the candidate symbol as being a zero-amplitude symbol when the candidate symbol is closer to an origin of the constellation than to symbols proximate thereto.

Although the present invention has been described in detail, those skilled in the art should understand that they can make various changes, substitutions and alterations herein without departing from the spirit and scope of the invention in its broadest form.

What is claimed is:

1. A system for recognizing zero-amplitude symbols in a quadrature amplitude modulated (QAM) signal, comprising:
a zero-amplitude symbol interpreter that recognizes a candidate symbol extracted from said signal as being a zero-amplitude symbol based on when said candidate symbol is within a zone having a boundary formed by a set of points that are equidistant between an origin of a constellation of symbols and a nearest one of four proximate symbols, said zero-amplitude symbol interrupting a regular rectangular array of said constellation of symbols, wherein ideal symbols of said regular rectangular array are substantially equidistant to each other.

2. The system as recited in claim 1 wherein said zero-amplitude symbol interpreter determines said candidate symbol is within said zone when a sum of an absolute value of A and B coordinates of said candidate symbol is less than one.

3. The system as recited in claim 1 wherein said zero-amplitude symbol separates subframes or constitutes an end-of-file symbol according to a Home Phoneline Networking Alliance standard.

4. The system as recited in claim 1 wherein said zero-amplitude symbol interpreter employs a linear algorithm to determine said candidate symbol is within said zone.

5. The system as recited in claim 1 wherein said symbols proximate said origin are located at relative amplitudes of:
1, 1,
1, −1,
−1, 1, and
−1, −1.

6. The system as recited in claim 1 wherein said constellation is arranged on a Cartesian plane.

7. The system as recited in claim 1 wherein said zero-amplitude symbol interpreter determines if said candidate symbol is within said zone without employing a slicer table.

8. A method of recognizing zero-amplitude symbols in a quadrature amplitude modulated (QAM) signal, comprising:
extracting a candidate symbol from said signal;
locating said candidate symbol relative to a constellation of symbols;
determining if said candidate symbol is within a zone having a boundary formed by a set of points that are equidistant between an origin of said constellation and a nearest one of four symbols proximate thereto; and
recognizing said candidate symbol as being a zero-amplitude symbol when said candidate symbol is within said zone, said zero-amplitude symbol interrupting a regular rectangular array of said constellation of symbols.

9. The method as recited in claim 8 wherein said candidate symbol is within said zone when a sum of an absolute value of A and B coordinates of said candidate symbol is less than one.

10. The method as recited in claim 8 wherein a plurality of said zero-amplitude symbols separate subframes according to a Home Phoneline Networking Alliance standard.

11. The method as recited in claim 8 wherein said symbols proximate said origin number four in quantity.

12. The method as recited in claim 8 wherein said symbols proximate said origin are located at relative amplitudes of:
1, 1,
1, −1,
−1, 1, and
−1, −1.

13. The method as recited in claim 8 wherein said constellation is arranged on a Cartesian plane.

14. The method as recited in claim 8 wherein if said candidate symbol is not within said zone, employing a slicer table to recognize said candidate symbol.

15. A digital receiver, comprising:
a digital-to-analog (D/A) converter that converts a received quadrature amplitude modulated (QAM) signal in digital form to analog form;
a demodulator, coupled to said D/A converter, that demodulates said QAM signal;
an equalizer, coupled to said demodulator, that equalizes said QAM signal;
a slicer, coupled to said equalizer, that recognizes non-zero- and zero-amplitude symbols in said QAM signal, said slicer having a system for recognizing said zero-amplitude symbols, including:
an amplitude detector that extracts a candidate symbol from said signal and locates said candidate symbol relative to a constellation of symbols, and
a zero-amplitude symbol interpreter, associated with said amplitude detector, that recognizes said candidate symbol as being a zero-amplitude symbol based on when said candidate symbol is within a zone having a boundary formed by a set of points that are equidistant between an origin of said constellation and a nearest one of four symbols proximate thereto, said zero-amplitude symbol interrupting a regular rectangular array of said constellation of symbols, wherein ideal symbols of said regular rectangular array are substantially equidistant to each other; and a decoder, coupled to said slicer, that decodes said non-zero- and zero-amplitude symbols to yield data.

16. The receiver as recited in claim 15 wherein said zero-amplitude symbol interpreter determines said candidate symbol is within said zone when a sum of an absolute value of A and B coordinates of said candidate symbol is less than one.

17. The receiver as recited in claim 15 wherein a plurality of said zero-amplitude symbols separate subframes or constitute an end-of-file symbol according to a Home Phoneline Networking Alliance standard.

18. The receiver as recited in claim 15 wherein said symbols proximate said origin number four in quantity.

19. The receiver as recited in claim 15 wherein said symbols proximate said origin are located at relative amplitudes of:

1, 1,
1, −1,
−1, 1, and
−1, −1.

20. The receiver as recited in claim 15 wherein said constellation is arranged on a Cartesian plane.

21. The receiver as recited in claim 15 wherein said slicer employs a slicer table to interpret said nonzero symbols and said zero-amplitude symbol interpreter employs a linear algorithm, free of said slicer table, to determine if said candidate symbol is within said zone.

* * * * *